US009745471B2

(12) United States Patent
Fukuda et al.

(10) Patent No.: US 9,745,471 B2
(45) Date of Patent: Aug. 29, 2017

(54) PREPREG, FIBER-REINFORCED COMPOSITE MATERIAL, AND RESIN COMPOSITION CONTAINING PARTICLES

(71) Applicants: JX NIPPON OIL & ENERGY CORPORATION, Tokyo (JP); FUJI JUKOGYO KABUSHIKI KAISHA, Tokyo (JP)

(72) Inventors: Yoshihiro Fukuda, Tokyo (JP); Takayuki Matsumoto, Tokyo (JP); Masaki Minami, Tokyo (JP); Naoyuki Sekine, Tokyo (JP); Masanori Nakajima, Tokyo (JP)

(73) Assignees: JX NIPPON OIL & ENERGY CORPORATION, Tokyo (JP); FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/780,283

(22) PCT Filed: Mar. 24, 2014

(86) PCT No.: PCT/JP2014/058099
§ 371 (c)(1),
(2) Date: Sep. 25, 2015

(87) PCT Pub. No.: WO2014/157098
PCT Pub. Date: Oct. 2, 2014

(65) Prior Publication Data
US 2016/0083582 A1    Mar. 24, 2016

(30) Foreign Application Priority Data
Mar. 29, 2013  (JP) .................................. 2013-072011

(51) Int. Cl.
  *C08L 79/04*  (2006.01)
  *C08J 5/24*  (2006.01)
  (Continued)

(52) U.S. Cl.
  CPC ............ *C08L 79/04* (2013.01); *C08G 59/621* (2013.01); *C08J 5/24* (2013.01); *C08L 63/00* (2013.01);
  (Continued)

(58) Field of Classification Search
  CPC ....................................................... C08L 79/04
  See application file for complete search history.

(56) References Cited

U.S. PATENT DOCUMENTS

2004/0170554 A1* 9/2004 Wadahara ............... B29B 11/16
                                                              423/447.2
2008/0081170 A1   4/2008 Tilbrook et al.
2011/0313080 A1  12/2011 Ihara et al.

FOREIGN PATENT DOCUMENTS

EP    2540755 A1   1/2013
EP    2 560 816    2/2013
(Continued)

OTHER PUBLICATIONS

Search Report issued by PCT/JP2014/058099 patent office in PCT/JP2014/058099 Patent Application No. , dated Jun. 24, 2014.
(Continued)

*Primary Examiner* — Megan McCulley
(74) *Attorney, Agent, or Firm* — Greenblum & Bernstein, P.L.C.

(57) ABSTRACT

A prepreg 10 comprises: a reinforcing fiber layer 3 including reinforcing fibers 1 and a resin composition 2 with which the space between fibers of the reinforcing fibers 1 is impregnated and which contains (A) a benzoxazine resin, (B) an epoxy resin, and (C) a curing agent having 2 or more
(Continued)

phenolic hydroxy groups in a molecule; and a surface layer 6a or 6b provided on at least one surface of the reinforcing fiber layer 3 and containing (A) a benzoxazine resin, (B) an epoxy resin, (C) a curing agent having 2 or more phenolic hydroxy groups in a molecule, and (D) polyamide resin particles 4 having an average particle size of 5 to 50 μm, wherein the polyamide resin particles 4 include a particle made of a polyamide 11.

1 Claim, 6 Drawing Sheets

(51) Int. Cl.
  C08L 63/00      (2006.01)
  C08L 77/02      (2006.01)
  C08L 77/00      (2006.01)
  C08G 59/62      (2006.01)
  C08K 5/13       (2006.01)
  C08K 5/353      (2006.01)

(52) U.S. Cl.
  CPC .............. *C08L 77/00* (2013.01); *C08L 77/02* (2013.01); *C08J 2379/04* (2013.01); *C08J 2463/02* (2013.01); *C08J 2477/02* (2013.01); *C08K 5/13* (2013.01); *C08K 5/353* (2013.01)

(56) References Cited

FOREIGN PATENT DOCUMENTS

| | | |
|---|---|---|
| JP | 2007-16121 | 1/2007 |
| JP | 2009-286895 | 12/2009 |
| JP | 2010-13636 | 1/2010 |
| JP | 2010-525101 | 7/2010 |
| JP | 2012-36347 | 2/2012 |
| WO | 2010/092723 | 8/2010 |
| WO | 2011/133353 A1 | 10/2011 |
| WO | 2013/046434 | 4/2013 |
| WO | 2013/122032 | 8/2013 |
| WO | 2013/122033 | 8/2013 |
| WO | 2013/122034 | 8/2013 |

OTHER PUBLICATIONS

International Preliminary Examination Report in PCT/JP2014/058099 issued Sep. 29, 2015.
European Search Report issued with respect to Application No. 14775001.2, dated Oct. 19, 2016.

* cited by examiner (a)

(b)

(a)

(b)

(c)

(a)

PREPREG, FIBER-REINFORCED COMPOSITE MATERIAL, AND RESIN COMPOSITION CONTAINING PARTICLES

TECHNICAL FIELD

The present invention relates to a prepreg, a fiber-reinforced composite material, and a resin composition containing particles used for the preparation of them. The present invention particularly relates to a fiber-reinforced composite material for aircraft uses, vessel uses, automobile uses, sports uses, and other general industrial uses and a prepreg used to obtain the composite material.

BACKGROUND ART

Fiber-reinforced composite materials made of various fibers and matrix resins are widely used for aircraft, vessels, automobiles, sports equipment, other general industrial uses, etc. because of their excellent mechanical properties. In recent years, with actual uses of them, the range of use of fiber-reinforced composite materials has been becoming wider and wider.

As such fiber-reinforced composite materials, ones using a benzoxazine resin are proposed in, for example, Patent Literatures 1 and 2. The benzoxazine resin has excellent moisture resistance and heat resistance, but has the problem of being inferior in toughness; and measures in which epoxy resins, various resin fine particles, etc. are blended to make up for the disadvantage are taken.

CITATION LIST

Patent Literature

Patent Literature 1: Japanese Patent Application Laid-Open No. 2007-16121
Patent Literature 2: Japanese Patent Application Laid-Open No. 2010-13636

SUMMARY OF INVENTION

Technical Problem

For fiber-reinforced composite materials for aircraft uses, further weight reduction is desired. To reduce the weight of the material, it is necessary to achieve, in particular, a compressive strength after impact (hereinafter, abbreviated as a CAI) and a flexural modulus out of the mechanical characteristics needed for aircraft uses at high level at the same time, and it is also necessary for the glass transition temperature of the resin material used to be kept high in order to maintain high temperature characteristics. However, it cannot necessarily be said that these can be achieved at high level at the same time in the examples specifically described in Patent Literatures above.

An object of the present invention is to provide a prepreg that makes it possible to obtain a fiber-reinforced composite material that, while using a benzoxazine resin having excellent moisture resistance and heat resistance, can achieve an excellent CAI and flexural modulus at high level at the same time and can also keep the glass transition temperature of the resin material high, a resin composition containing particles for obtaining the prepreg, and a fiber-reinforced composite material.

Solution to Problem

To solve the problem mentioned above, the present invention provides a prepreg comprising: a reinforcing fiber layer including reinforcing fibers and a resin composition with which the space between fibers of the reinforcing fibers is impregnated and which contains (A) a benzoxazine resin, (B) an epoxy resin, and (C) a curing agent having 2 or more phenolic hydroxy groups in a molecule; and a surface layer provided on at least one surface of the reinforcing fiber layer and containing (A) a benzoxazine resin, (B) an epoxy resin, (C) a curing agent having 2 or more phenolic hydroxy groups in a molecule, and (D) polyamide resin particles having an average particle size of 5 to 50 µm, wherein the polyamide resin particles include a particle made of a polyamide 11.

By the prepreg of the present invention being stacked plurally and heated under increased pressure, a fiber-reinforced composite material that, while using a benzoxazine resin having excellent moisture resistance and heat resistance, can achieve an excellent CAI and flexural modulus at high level at the same time and can also keep the glass transition temperature of the resin material high can be obtained.

The present inventors presume the reason why the CAI and the flexural modulus can be improved by the prepreg mentioned above as follows. A decrease in the melting temperature of the polyamide resin particles occurs due to the presence of the compound having phenolic hydroxy groups that is the curing agent of (A) the benzoxazine resin. Here, if the melting temperature of the polyamide resin particles is too low, during the curing of the thermosetting resin in preparing a fiber-reinforced composite material using the prepreg, the polyamide resin particles are likely to melt and the melted polyamide resin particles are likely to enter the reinforcing fiber layer; but it is presumed that, by using the specific polyamide resin particles mentioned above, a state where it is difficult for the polyamide resin particles to flow can be created and consequently the effects of improving the CAI and the flexural modulus have been able to be obtained sufficiently. In addition, it is presumed that also the fact that the polyamide resin particles mentioned above melt a little during the preparation of a fiber-reinforced composite material has contributed to the improvement of the CAI and the flexural modulus.

It is preferable that the surface layer mentioned above contain 65 to 78 parts by mass of the (A) component mentioned above, 22 to 35 parts by mass of the (B) component mentioned above, 5 to 20 parts by mass of the (C) component mentioned above, and 15 to 45 parts by mass of the (D) component mentioned above when it is assumed that the total amount of the (A) component mentioned above and the (B) component mentioned above is 100 parts by mass.

The present invention also provides a fiber-reinforced composite material obtained by stacking the prepreg of the present invention mentioned above plurally and performing heating under increased pressure.

By being obtained from the prepreg according to the present invention, the fiber-reinforced composite material of the present invention has excellent moisture resistance and heat resistance and can achieve an excellent CAI and flexural modulus at high level at the same time. By the fiber-reinforced composite material of the present invention, the weight of the material can be reduced through the excellent physical properties mentioned above.

The present invention also provides a resin composition containing particles comprising (A) a benzoxazine resin, (13) an epoxy resin, (C) a curing agent having 2 or more phenolic hydroxy groups in a molecule, and (D) polyamide resin particles having an average particle size of 5 to 50 μm, wherein the polyamide resin particles include a particle made of a polyamide 11.

By the resin composition containing particles of the present invention, the surface layer of the prepreg according to the present invention described above can be fabricated.

Advantageous Effects of Invention

According to the present invention, a prepreg that makes it possible to obtain a fiber-reinforced composite material that, while using a benzoxazine resin having excellent moisture resistance and heat resistance, can achieve an excellent CM and flexural modulus at high level at the same time and can also keep the glass transition temperature of the resin material high, a resin composition containing particles for obtaining the prepreg, and a fiber-reinforced composite material can be provided.

The fiber-reinforced composite material of the present invention can be suitably used for aircraft uses, vessel uses, automobile uses, sports uses, and other general industrial uses, and is useful particularly for aircraft uses.

DESCRIPTION OF EMBODIMENTS

The present invention will now be described in detail.

Figure 1:
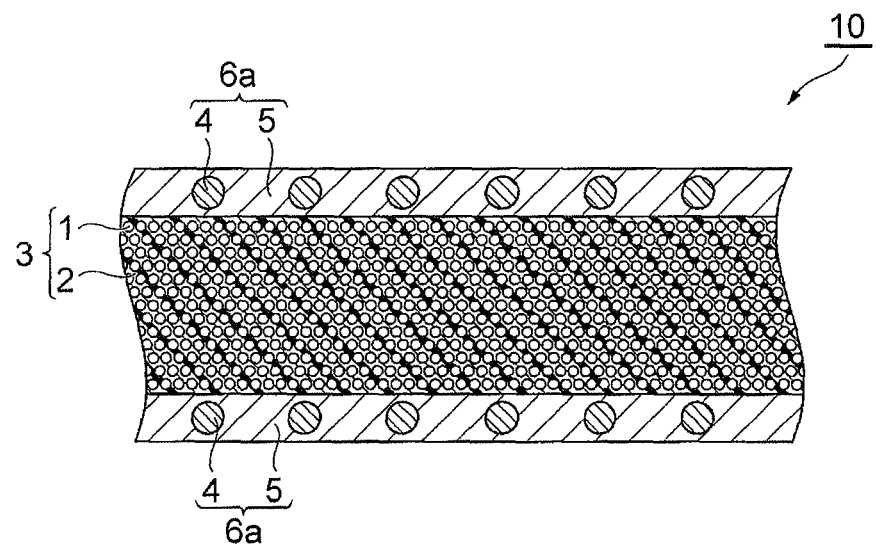
FIG. 1 is schematic cross-sectional views for describing prepregs according to the present invention.
Figure 1:
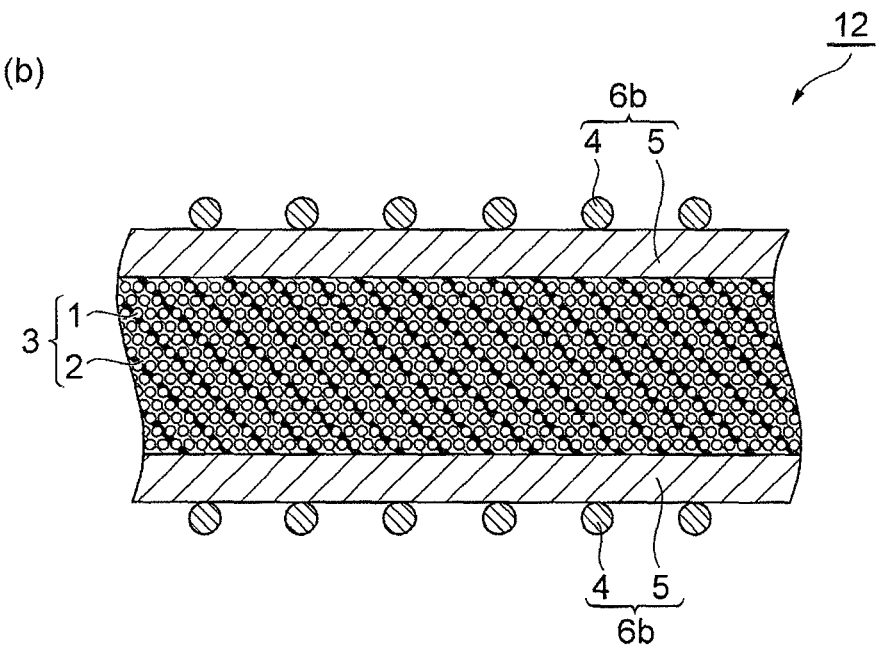

FIG. 1 is schematic cross-sectional views for describing a prepreg according to the present invention. A prepreg 10 shown in (a) of FIG. 1 comprises: a reinforcing fiber layer 3 including reinforcing fibers 1 and a resin composition 2 with which the space between fibers of the reinforcing fibers 1 is impregnated; and a surface layer 6a provided on a surface of the reinforcing fiber layer 3 and containing polyamide resin particles 4 and a resin composition 5. In the surface layer 6a of the prepreg 10, the polyamide resin particles 4 are included in the layer of the resin composition 5. A prepreg 12 shown in (b) of FIG. 1 has the same configuration as the prepreg 10 except that it comprises, in place of the surface layer 6a in the prepreg 10, a surface layer 6b in which polyamide resin particles 4 are attached to the surface on the opposite side to the reinforcing fiber layer 3 of the layer of the resin composition 5.

In the prepregs 10 and 12 according to the embodiment, the resin composition 2 contains (A) a benzoxazine resin, (B) an epoxy resin, and (C) a curing agent having 2 or more phenolic hydroxy groups in a molecule; the surface layers 6a and 6b contain (A) a benzoxazine resin, (B) an epoxy resin, (C) a curing agent having 2 or more phenolic hydroxy groups in a molecule, and (D) polyamide resin particles having an average particle size of 5 to 50 μm; and the polyamide resin particles include a particle made of a polyamide 11.

As (A) the benzoxazine resin used in the present invention (hereinafter, occasionally referred to as an (A) component), a compound having a benzoxazine ring represented by the following formula (A-1) is given.

[Chemical Formula 1]

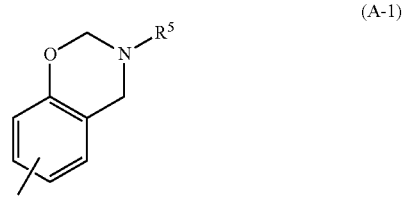

In formula (A-1), $R^5$ represents a linear alkyl group having 1 to 12 carbon atoms, a cyclic alkyl group having 3 to 8 carbon atoms, an aryl group having 6 to 14 carbon atoms, or an aryl group substituted with a linear alkyl group having 1 to 12 carbon atoms or a halogen. A hydrogen atom may be bonded to the bond.

Examples of the linear alkyl group having 1 to 12 carbon atoms include a methyl group, an ethyl group, a propyl group, an isopropyl group, a n-butyl group, an isobutyl group, and a t-butyl group. Examples of the cyclic alkyl group having 3 to 8 carbon atoms include a cyclopentyl group and a cyclohexyl group. Examples of the aryl group having 6 to 14 carbon atoms include a phenyl group, a 1-naphthyl group, a 2-naphthyl group, a phenanthryl group, and a biphenyl group. Examples of the aryl group substituted with a linear alkyl group having 1 to 12 carbon atoms or a halogen include an o-tolyl group, a m-tolyl group, a p-tolyl group, a xylyl group, an o-ethylphenyl group, a m-ethylphenyl group, a p-ethylphenyl group, an o-t-butylphenyl group, a m-t-butylphenyl group, a p-t-butylphenyl group, an o-chlorophenyl group, and an o-bromophenyl group.

As $R^5$, of the examples mentioned above, a methyl group, an ethyl group, a propyl group, a phenyl group, and an o-methylphenyl group are preferable because of providing good handleability.

Furthermore, a compound having benzoxazine rings represented by the following formula (A-2) is given.

[Chemical Formula 2]

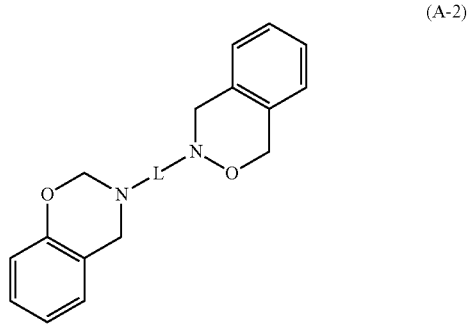

In formula (A-2), L represents an alkylene group or an arylene group.

Preferred examples of the benzoxazine resin of the (A) component include the monomers represented by the following formulae, oligomers in which several molecules of the monomers are polymerized, and reaction products of at least one of the monomers represented by the following formulae and a compound having a benzoxazine ring having a structure different from these monomers.

[Chemical Formula 3]

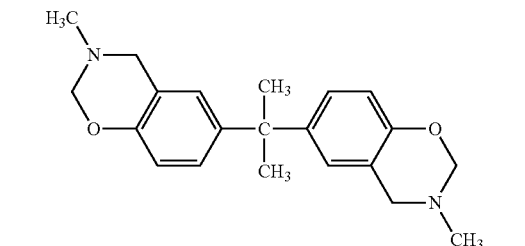

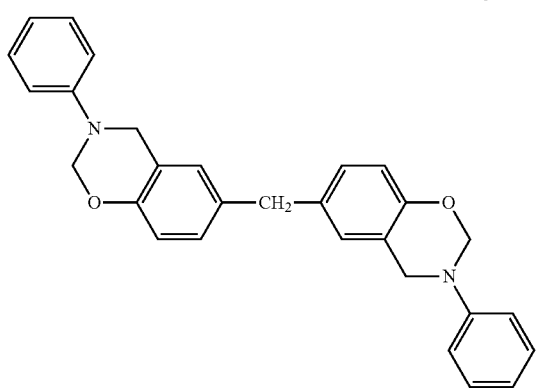

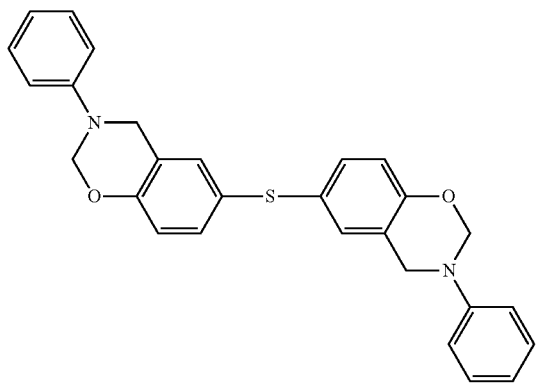

[Chemical Formula 4]

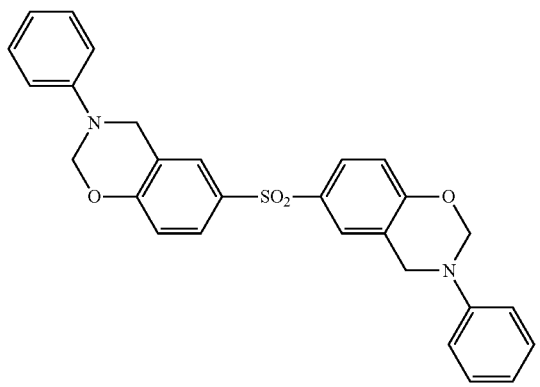

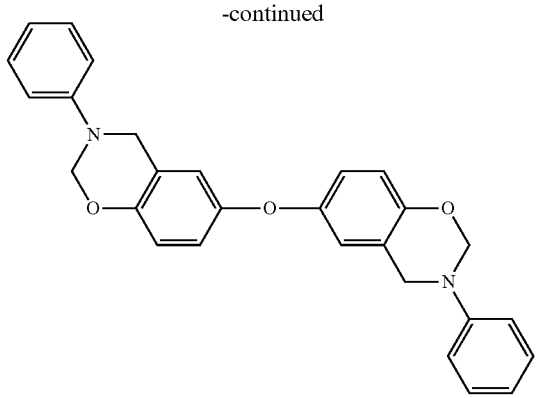

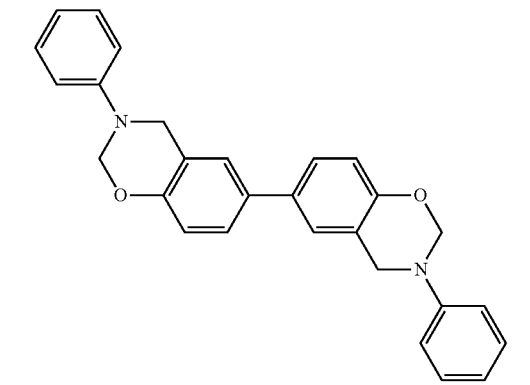

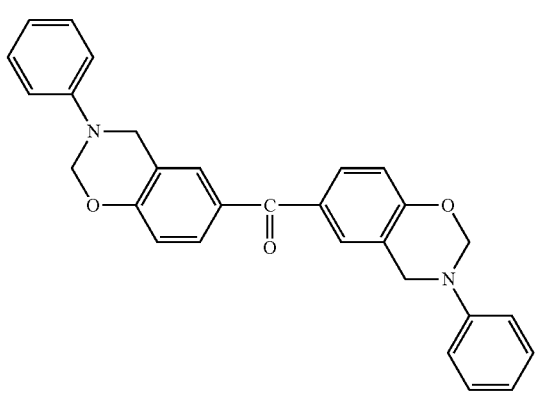

[Chemical Formula 5]

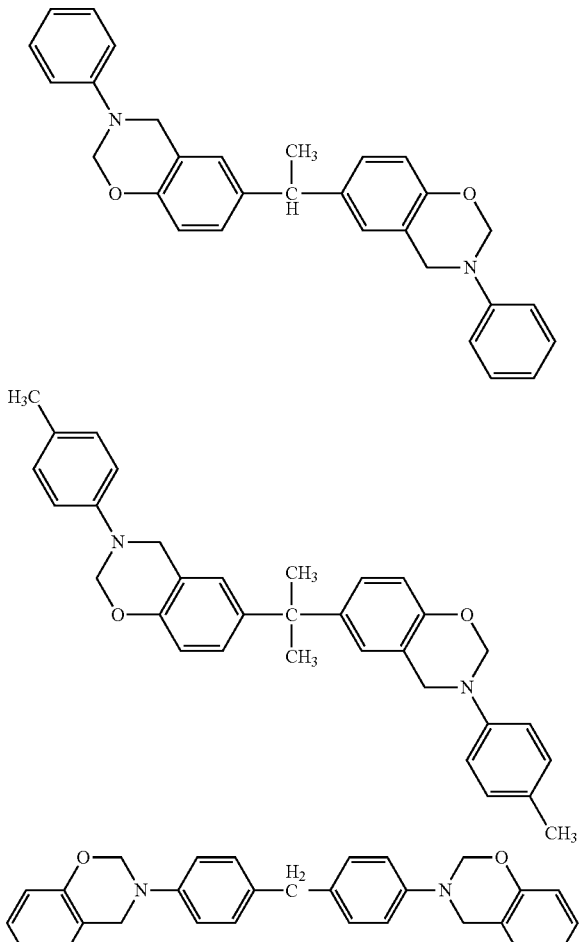

[Chemical Formula 6]

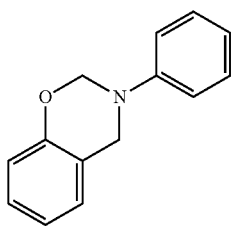

The (A) component forms a skeleton similar to phenol resins by the benzoxazine ring polymerizing by ring-opening, and is therefore excellent in fire retardancy. Furthermore, excellent mechanical characteristics such as a low percentage of water absorption and a high elastic modulus are obtained because of its dense structure.

The (A) component may be used singly or in combinations of two or more.

(B) the epoxy resin (hereinafter, occasionally referred to as a (B) component) used in the present invention controls the viscosity of the composition, and is blended as a component that enhances the curability of the composition. Preferred examples of the (B) component include epoxy resins produced using compounds such as amines, phenols, carboxylic acids, and an intramolecular unsaturated carbon or the like as a precursor.

Examples of the epoxy resins produced using amines as a precursor include tetraglycidyldiaminodiphenylmethane, glycidyl compounds of xylenediamine, triglycidylaminophenol, and glycidylaniline, regioisomers of each thereof and alkyl group- or halogen-substituted products thereof. Hereinafter, when commercially available products are given as examples, for liquid products, the complex viscoelastic modulus $\eta^*$ at 25° C. obtained with a dynamic viscoelasticity measurement apparatus described later is written as the viscosity.

Examples of the commercially available products of tetraglycidyldiaminodiphenylmethane include "SUMI-EP-DXY" (registered trademark, the same applies hereinafter) ELM 434 (manufactured by Sumitomo Chemical Company, Limited), "Araldite" (registered trademark, the same applies hereinafter) MY 720, "Araldite" MY 721, "Araldite" MY 9512, "Araldite" MY 9612, "Araldite" MY 9634, and "Araldite" MY 9663 (all manufactured by Huntsman Corporation), and "jER" (registered trademark, the same applies hereinafter) 604 (manufactured by Mitsubishi Chemical Corporation).

Examples of the commercially available products of triglycidylaminophenol include "jER" 630 (viscosity: 750 mPa·s) (manufactured by Mitsubishi Chemical Corporation), "Araldite" MY 0500 (viscosity: 3500 mPa·s) and MY 0510 (viscosity: 600 mPa·s) (both manufactured by Huntsman Corporation), and ELM 100 (viscosity: 16000 mPa·s) (manufactured by Sumitomo Chemical Company, Limited).

Examples of the commercially available products of glycidylanilines include GAN (viscosity: 120 mPa·s) and GOT (viscosity: 60 mPa·s) (both manufactured by Nippon Kayaku Co., Ltd.).

Examples of the glycidyl ether-type epoxy resins produced using a phenol as a precursor include bisphenol A-type epoxy resins, bisphenol F-type epoxy resins, bisphenol S-type epoxy resins, epoxy resins having a biphenyl skeleton, phenol novolac-type epoxy resins, cresol novolac-type epoxy resins, resorcinol-type epoxy resins, epoxy resins having a naphthalene skeleton, trisphenylmethane-type epoxy resins, phenolaralkyl-type epoxy resins, dicyclopentadiene-type epoxy resins, diphenylfluorene-type epoxy resins, and various isomers of each thereof and alkyl group- or halogen-substituted products thereof. Also epoxy resins obtained by modifying epoxy resins produced using a phenol as a precursor with a urethane or an isocyanate are included in this type.

Examples of the commercially available products of liquid bisphenol A-type epoxy resins include "jER" 825 (viscosity: 5000 mPa·s), "jER" 826 (viscosity: 8000 mPa·s), "jER" 827 (viscosity: 10000 mPa·s), and "jER" 828 (viscosity: 13000 mPa·s) (all manufactured by Mitsubishi Chemical Corporation), "EPICLON" (registered trademark, the same applies hereinafter) 850 (viscosity: 13000 mPa·s) (manufactured by DIC Corporation), "Epotohto" (registered trademark, the same applies hereinafter) YD-128 (viscosity: 13000 mPa·s) (manufactured by NIPPON STEEL & SUMIKIN CHEMICAL CO., LTD.), and DER-331 (viscosity: 13000 mPa·s) and DER-332 (viscosity: 5000 mPa·s) (manufactured by The Dow Chemical Company). Examples of the commercially available products of solid or semisolid bisphenol A-type epoxy resins include "jER" 834, "jER" 1001, "jER" 1002, "jER" 1003, "jER" 1004, "jER" 1004AF, "jER" 1007, and "jER" 1009 (all manufactured by Mitsubishi Chemical Corporation).

Examples of the commercially available products of liquid bisphenol F-type epoxy resins include "jER" 806 (viscosity: 2000 mPa·s), "jER" 807 (viscosity: 3500 mPa·s), "jER" 1750 (viscosity: 1300 mPa·s), and "jER" (all manufactured by Mitsubishi Chemical Corporation), "EPICLON"

830 (viscosity: 3500 mPa·s) (manufactured by DIC Corporation), and "Epotohto" YD-170 (viscosity: 3500 mPa·s) and "Epotohto" YD-175 (viscosity: 3500 mPa·s) (both manufactured by NIPPON STEEL & SUMIKIN CHEMICAL CO., LTD.). Examples of the commercially available products of solid bisphenol F-type epoxy resins include 4004P, "jER" 4007P, and "jER" 4009P (all manufactured by Mitsubishi Chemical Corporation) and "Epotohto" YDF 2001 and "Epotohto" YDF 2004 (both manufactured by NIPPON STEEL & SUMIKIN CHEMICAL CO., LTD.).

Examples of the bisphenol S-type epoxy resins include EXA-1515 (manufactured by DIC Corporation).

Examples of the commercially available products of epoxy resins having a biphenyl skeleton include "jER" YX4000H, "jER" YX4000, and "jER" YL6616 (all manufactured by Mitsubishi Chemical Corporation) and NC-3000 (manufactured by Nippon Kayaku Co., Ltd.).

Examples of the commercially available products of phenol novolac-type epoxy resins include "jER" 152 and "jER" 154 (both manufactured by Mitsubishi Chemical Corporation) and "EPICLON" N-740, "EPICLON" N-770, and "EPICLON" N-775 (all manufactured by DIC Corporation).

Examples of the commercially available products of cresol novolac-type epoxy resins include "EPICLON" N-660, "EPICLON" N-665, "EPICLON" N-670, "EPICLON" N-673, and "EPICLON" N-695 (all manufactured by DIC Corporation) and EOCN-1020, EOCN-102S, and EOCN-104S (all manufactured by Nippon Kayaku Co., Ltd.).

Examples of the commercially available products of resorcinol-type epoxy resins include "Denacol" (registered trademark, the same applies hereinafter) EX-201 (viscosity: 250 mPa·s) (manufactured by Nagase ChemteX Corporation).

Examples of the commercially available products of epoxy resins having a naphthalene skeleton include "EPICLON" HP 4032 (manufactured by DIC Corporation) and NC-7000 and NC-7300 (both manufactured by Nippon Kayaku Co., Ltd.).

Examples of the commercially available products of trisphenylmethane-type epoxy resins include TMH-574 (manufactured by Sumitomo Chemical Company, Limited).

Examples of the commercially available products of dicyclopentadiene-type epoxy resins include "EPICLON" HP 7200, "EPICLON" HP 7200L, and "EPICLON" HP 7200H (all manufactured by DIC Corporation), "Tactix" (registered trademark) 558 (manufactured by Huntsman Corporation), and XD-1000-1L and XD-1000-2L (both manufactured by Nippon Kayaku Co., Ltd.).

Examples of the commercially available products of urethane and isocyanate-modified epoxy resins include AER 4152 having an oxazolidone ring (manufactured by Asahi Kasei E-materials Corporation).

Examples of the epoxy resins produced using a carboxylic acid as a precursor include glycidyl compounds of phthalic acid, glycidyl compounds of hexahydrophthalic acid and dimer acids, and various isomers of each of them.

Examples of the commercially available products of phthalic acid diglycidyl esters include "EPOMIK" (registered trademark, the same applies hereinafter) R508 (viscosity: 4000 mPa·s) (manufactured by Mitsui Chemicals, Inc.) and "Denacol" EX-721 (viscosity: 980 mPa·s) (manufactured by Nagase ChemteX Corporation).

Examples of the commercially available products of hexahydrophthalic acid diglycidyl esters include "EPOMIK" R540 (viscosity: 350 mPa·s) (manufactured by Mitsui Chemicals, Inc.) and AK-601 (viscosity: 300 mPa·s) (manufactured by Nippon Kayaku Co., Ltd.).

Examples of the commercially available products of dimer acid diglycidyl esters include "jER" 871 (viscosity: 650 mPa·s) (manufactured by Mitsubishi Chemical Corporation) and "Epotohto" YD-171 (viscosity: 650 mPa·s) (manufactured by NIPPON STEEL & SUMIKIN CHEMICAL CO., LTD.).

Examples of the epoxy resins produced using an intramolecular unsaturated carbon as a precursor include alicyclic epoxy resins. Examples of the alicyclic epoxy resins include (3',4'-epoxycyclohexane)methyl-3,4-epoxycyclohexanecarboxylate, (3',4'-epoxycyclohexane)octyl-3,4-epoxycyclohexanecarboxylate, and 1-methyl-4-(2-methyloxiranyl)-7-oxabicyclo[4.1.0]heptane.

Examples of the commercially available products of (3',4'-epoxycyclohexane)methyl-3,4-epoxycyclohexanecarboxylate include "CELLOXIDE" (registered trademark, the same applies hereinafter) 2021P (viscosity: 250 mPa·s) (manufactured by Daicel Corporation) and CY 179 (viscosity: 400 mPa·s) (manufactured by Huntsman Corporation); examples of the commercially available products of (3',4'-epoxycyclohexane)octyl-3,4-epoxycyclohexanecarboxylate include "CELLOXIDE" 2081 (viscosity: 100 mPa·s) (manufactured by Daicel Corporation); and examples of the commercially available products of 1-methyl-4-(2-methyloxiranyl)-7-oxabicyclo[4.1.0]heptane include "CELLOXIDE" 3000 (viscosity: 20 mPa·s) (manufactured by Daicel Corporation).

In the embodiment, an epoxy resin that is in a liquid form at 25° C. may be blended from the viewpoints of tackiness and draping properties. It is preferable that the viscosity at 25° C. of the epoxy resin that is in a liquid form at 25° C. be as low as possible from the viewpoints of tackiness and draping properties. Specifically, 5 mPa·s or more, which is the lower limit obtained with commercially available products of epoxy resins, and 20000 mPa·s or less are preferable, and 5 mPa·s or more and 15000 mPa·s or less are more preferable. If the viscosity at 25° C. is more than 20000 mPa·s, tackiness or draping properties may be reduced.

On the other hand, an epoxy resin that is in a solid form at 25° C. may be blended from the viewpoint of heat resistance. As the epoxy resin that is in a solid form at 25° C., epoxy resins having a high aromatic content are preferable; and examples include epoxy resins having a biphenyl skeleton, epoxy resins having a naphthalene skeleton, and phenolaralkyl-type epoxy resins.

The (B) component may be used singly or in combinations of two or more.

As (C) the curing agent having 2 or more phenolic hydroxy groups in a molecule (hereinafter, occasionally referred to as a (C) component) used in the present invention, polyfunctional phenols such as bisphenols are given; and examples include bisphenol A, bisphenol F, bisphenol S, thiodiphenol, and bisphenols represented by the following formula (C-1).

[Chemical Formula 7]

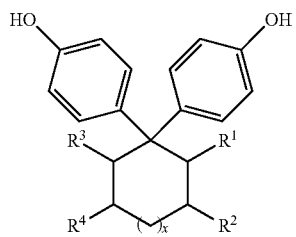

(C-1)

In formula (C-1), and $R^4$ represent a hydrogen atom or a hydrocarbon group; when $R^1$, $R^2$, $R^3$, or $R^4$ is a hydrocarbon group, they are a linear or branched alkyl group having 1 to 4 carbon atoms, or adjacent $R^1$ and $R^2$ or adjacent $R^3$ and $R^4$ bind to form a substituted or unsubstituted aromatic ring having 6 to 10 carbon atoms or a substituted or unsubstituted alicyclic structure having 6 to 10 carbon atoms; and x represents 0 or 1.

Examples of the curing agent represented by the above formula (C-1) include the compounds represented by the following formulae.

[Chemical Formula 8]

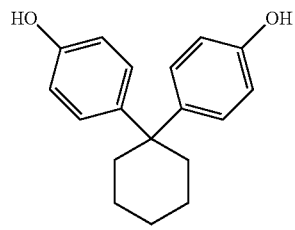

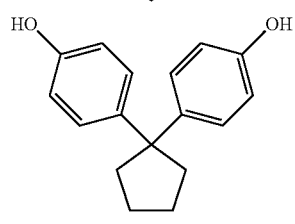

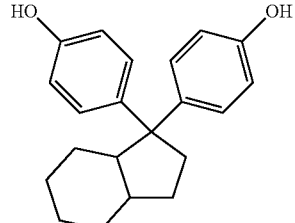

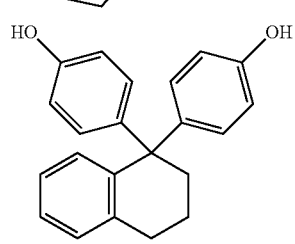

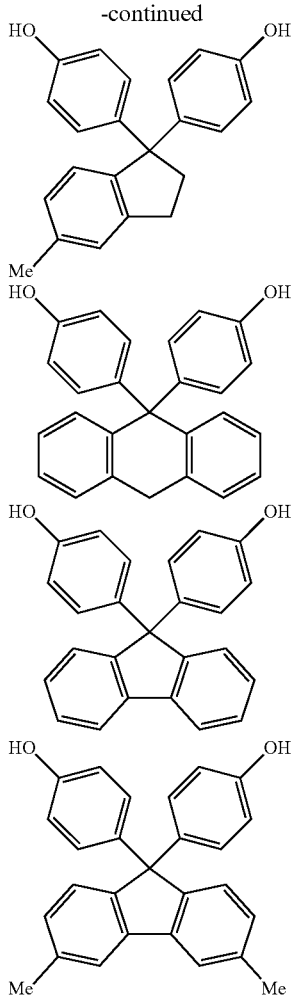

In the embodiment, from the viewpoints of the suppression of the reduction in the melting temperature of the polyamide and the improvement of the heat resistance of the resin cured substance, bisphenol A, bisphenol F, thiobisphenol (hereinafter, occasionally referred to as TDP), 9,9-bis(4-hydroxyphenyl)fluorene (hereinafter, occasionally referred to as BPF), and 1,1-bis(4-hydroxyphenyl)cyclohexane (hereinafter, occasionally referred to as BPC) are preferable.

The (C) component may be used singly or in combinations of two or more.

In the embodiment, a curing agent other than the (C) component mentioned above may be used in combination. Examples of the curing agent that can be used in combination include tertiary aromatic amines typified by N,N-dimethylaniline, tertiary aliphatic amines such as triethylamine, imidazole derivatives, and pyridine derivatives. These may be used singly or in combinations of two or more.

(D) the polyamide resin particles having an average particle size of 5 to 50 μm (hereinafter, occasionally referred to as a (D) component) used in the present invention include a particle made of a polyamide 11. The polyamide 11 is obtained by polymerizing undecanelactam by ring-opening. The melting point of the polyamide resin particles mentioned above is approximately 188° C. By using (D) the polyamide resin particles having the melting point mentioned above, the polyamide resin particles can be melted moderately and the CAI and the flexural modulus can be improved, while the polyamide resin particles melting more than necessary and entering the reinforcing fiber layer is suppressed during the preparation of a fiber-reinforced composite material. The melting point of (D) the polyamide resin particles is found by increasing the temperature at a rate of 10° C./minute from 25° C. using a differential scanning calorimeter (DSC) and measuring the temperature of the top of the resulting endothermic peak.

Here, the average particle size of the polyamide resin particles refers to the average value of the measured lengths of the major axes of 100 particles selected arbitrarily from particles that are magnified 200 to 500 times with a scanning electron microscope (SEM).

As the polyamide resin particles used in the present invention, commercially available products may be used; and examples include "Rilsan PA 11" (registered trademark, manufactured by ARKEMA K.K.).

As the average particle size of the polyamide resin particles mentioned above, 5 to 50 μm are preferable and 10 to 30 μm are more preferable from the viewpoint of controlling the thickness of the surface layer.

In the embodiment, for the amounts of the (A) component and the (B) component contained in the resin composition 2, when it is assumed that the total amount of the (A) component and the (B) component is 100 parts by mass, it is preferable that the amount of the (A) component be 65 to 80 parts by mass and the amount of the (B) component be 20 to 35 parts by mass, it is more preferable that the amount of the (A) component be 65 to 78 parts by mass and the amount of the (B) component be 22 to 35 parts by mass, and it is still more preferable that the amount of the (A) component be 70 to 78 parts by mass and the amount of the (B) component be 22 to 30 parts by mass. When the proportion of the contained (A) component is less than 65 parts by mass, that is, when the proportion of the contained (B) component is more than 35 parts by mass, the elastic modulus and the water resistance of the resulting fiber-reinforced composite tend to be reduced and the glass transition temperature of the resin cured substance tends to be reduced.

For the amount of the (C) component contained in the resin composition 2, when it is assumed that the total amount of the (A) component and the (B) component is 100 parts by mass, it is preferable to be 5 to 20 parts by mass and it is more preferable to be 7 to 15 parts by mass. If the amount of the contained (C) component is less than 5 parts by mass, it tends to be difficult to sufficiently increase the CAI and the flexural modulus in the fiber-reinforced composite material; and in the case of more than 20 parts by mass, mechanical properties such as the glass transition temperature of the cured substance tend to be reduced.

In the embodiment, for the amounts of the (A) component and the (B) component contained in the surface layers 6a and 6b, when it is assumed that the total amount of the (A) component and the (B) component is 100 parts by mass, it is preferable that the amount of the (A) component be 65 to 80 parts by mass and the amount of the (B) component be 20 to 35 parts by mass, it is more preferable that the amount of the (A) component be 65 to 78 parts by mass and the amount of the (B) component be 22 to 35 parts by mass, and it is still more preferable that the amount of the (A) component be 70 to 78 parts by mass and the amount of the (B) component be 22 to 30 parts by mass. If the proportion of the contained (A) component is less than 65 parts by mass, that is, if the proportion of the contained (B) component is more than 35 parts by mass, the elastic modulus and the water resistance of the resulting fiber-reinforced composite tend to be reduced and the glass transition temperature of the resin cured substance tends to be reduced.

For the amount of the (C) component contained in the surface layers 6a and 6b, when it is assumed that the total amount of the (A) component and the (B) component is 100 parts by mass, it is preferable to be 5 to 20 parts by mass and it is more preferable to be 7 to 15 parts by mass. If the amount of the contained (C) component is less than 5 parts by mass, it tends to be difficult to sufficiently increase the CAI and the flexural modulus in the fiber-reinforced composite material; and in the case of more than 20 parts by mass, mechanical properties such as the glass transition temperature of the cured substance tend to be reduced.

For the amount of the (D) component contained in the surface layers 6a and 6b, when it is assumed that the total amount of the (A) component and the (B) component is 100 parts by mass, it is preferable to be 15 to 45 parts by mass and it is more preferable to be 20 to 40 parts by mass. If the amount of the contained (D) component is less than 15 parts by mass, it tends to be difficult to sufficiently increase the CAI and the flexural modulus in the fiber-reinforced composite material; and in the case of more than 45 parts by mass, the flexural modulus tends to be reduced.

The surface layers 6a and 6b in the prepreg of the embodiment refer to between the prepreg surface and the reinforcing fibers of the reinforcing fiber layer, and the amount mentioned above of the (D) component contained in the surface layer can be calculated on the basis of, for example, the amounts of the (A) component, the (B) component, and the (C) component contained detected between the prepreg surface and the reinforcing fibers of the reinforcing fiber layer.

In the prepreg of the embodiment, another component such as (E) a toughness improver may be blended to the surface layer and the reinforcing fiber layer to the extent that their physical properties are not impaired. Examples of (E) the toughness improver include phenoxy resins and polyethersulfone.

As still another component, a nanocarbon, a fire retardant, a mold release agent, etc. may be blended. Examples of the nanocarbon include carbon nanotubes, fullerene, and derivatives of each of them. Examples of the fire retardant include red phosphorus, phosphoric acid esters such as triphenyl phosphate, tricresyl phosphate, trixylenyl phosphate, cresyl diphenyl phosphate, xylenyl diphenyl phosphate, resorcinol bis(phenyl phosphate), and bisphenol A bis(diphenyl phosphate), and boric acid esters. Examples of the mold release agent include silicon oil, stearic acid esters, and carnauba wax.

As the reinforcing fibers in the present invention, glass fibers, carbon fibers, graphite fibers, aramid fibers, boron fibers, alumina fibers, silicon carbide fibers, and the like may be used. Two or more of these fibers may be mixed for use. It is preferable to use carbon fibers or graphite fibers and it is more preferable to use carbon fibers in order to obtain a molded product that is lighter in weight and higher in durability.

As the carbon fibers used in the present invention, either of PAN-based carbon fibers and pitch-based carbon fibers may be used.

In the present invention, any type of carbon fibers or graphite fibers may be used in accordance with the use. For the tensile elastic modulus in a strand tensile test of the carbon fibers or the graphite fibers, it is preferable to be 150 to 650 GPa, it is more preferable to be 200 to 550 GPa, and it is still more preferable to be 230 to 500 GPa because a composite material that is excellent in impact resistance and has high rigidity and mechanical strength can be obtained. The strand tensile test refers to a test performed on the basis of JIS R 7601 (1986) after carbon fibers or graphite fibers in a bundle form are impregnated with an epoxy resin and curing is performed at a temperature of 130° C. for 35 minutes.

The form of the reinforcing fibers in the prepreg and the fiber-reinforced composite material of the embodiment is not particularly limited; for example, long fibers uniformly extended in one direction, rattans, textiles, mats, knits, braids, short fibers chopped to a length of less than 10 mm, and the like may be used. Here, the long fiber(s) refers to a single fiber or a fiber bundle substantially continuous for 10 mm or more. The short fiber(s) refers to a fiber bundle cut to a length of less than 10 mm. For uses in which it is required for the specific strength and the specific elastic modulus to be high, an arrangement in which a reinforcing fiber bundle is uniformly extended in one direction like the prepreg of the embodiment is most suitable; but also an arrangement of a cloth (textile) form, which is easy to handle, can be used.

In the prepreg of the embodiment, for the amount of reinforcing fibers per unit area, it is preferable to be 25 to 3000 g/m$^2$ and it is more preferable to be 70 to 3000 g/m$^2$. If the amount of reinforcing fibers is less than 25 g/m$^2$, it is necessary to increase the number of stacked sheets in order to obtain a prescribed thickness during molding a fiber-reinforced composite material, and operation may be complicated. On the other hand, if the amount of reinforcing fibers is more than 3000 g/m$^2$, the draping properties of the prepreg tend to be poor. When the prepreg is a flat surface or a simple curved surface, the amount of reinforcing fibers may be more than 3000 g/m$^2$. The percentage of contained fibers in the prepreg is preferably 30 to 90 mass %, more preferably 35 to 85 mass %, and still more preferably 40 to 80 mass %. If the content percentage is less than 30 mass %, the amount of the resin is too large; and the advantage of a fiber-reinforced composite material excellent in specific strength and specific elastic modulus may not be obtained, or during the molding of a fiber-reinforced composite material, the amount of heat generated during curing may be too large. If the content percentage is more than 90 mass %, an impregnation defect of the resin occurs and the resulting composite material tends to include a large amount of voids.

Figure 2:
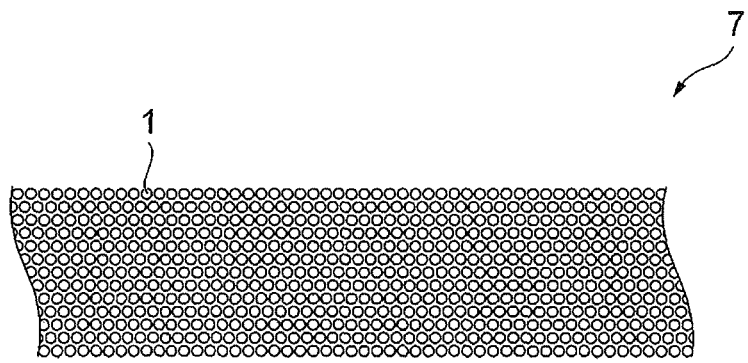
FIG. 2 is schematic cross-sectional views for describing a production method for a prepreg according to the present invention.
Figure 2:
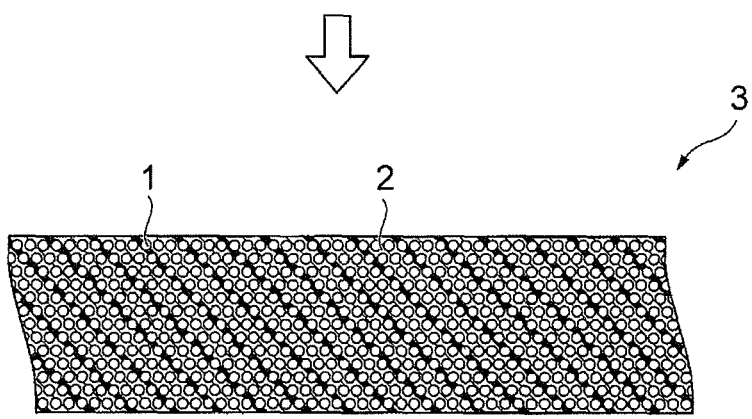
Figure 2:
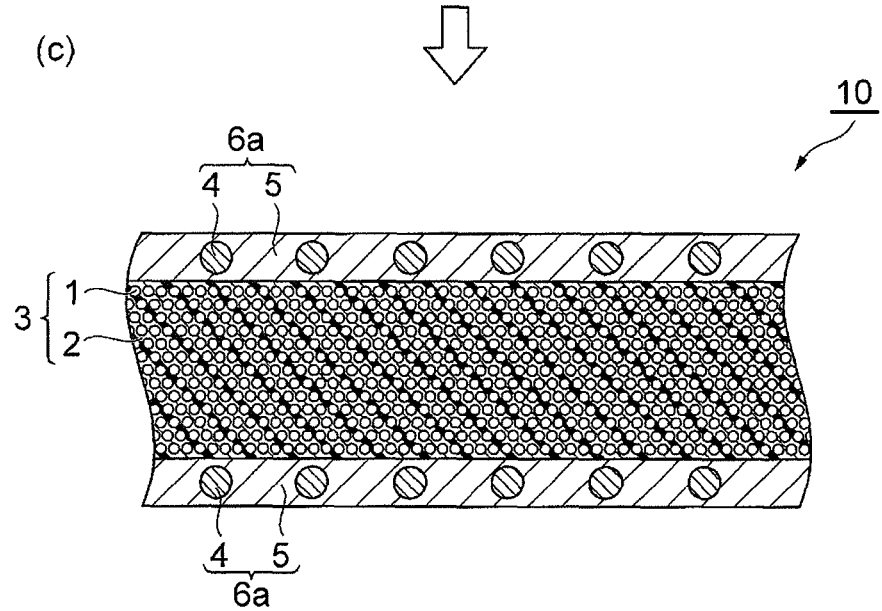
Figure 3:
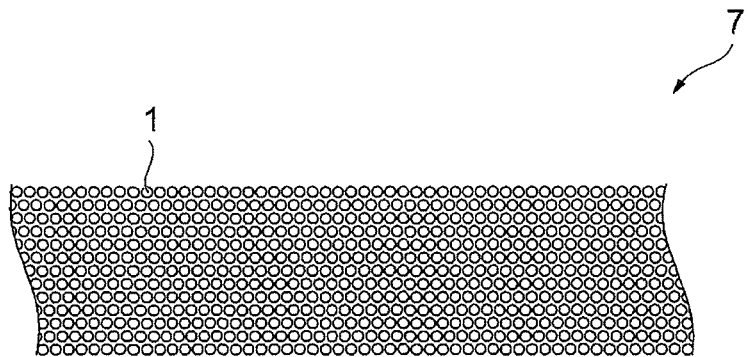
FIG. 3 is schematic cross-sectional views for describing a production method for a prepreg according to the present invention.
Figure 3:
Figure 3:
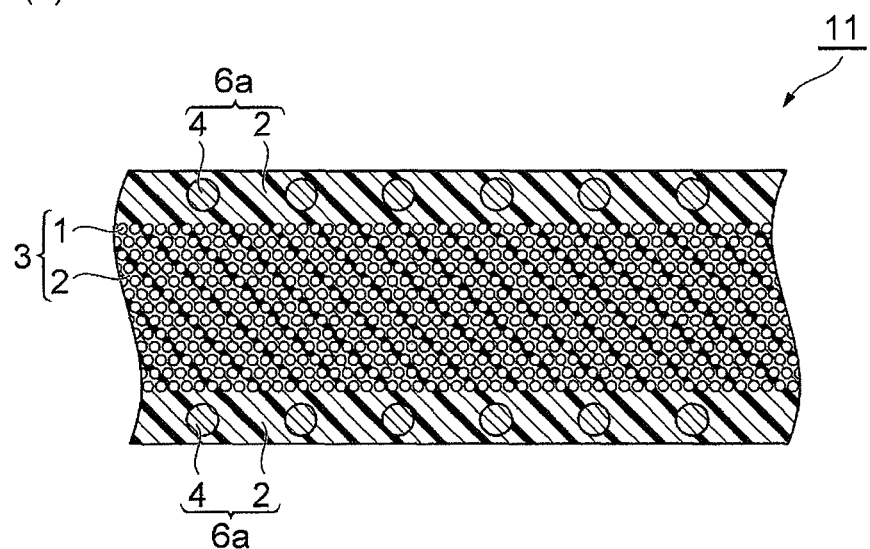

Next, production methods for prepregs according to the present invention are described. FIG. 2 and FIG. 3 are schematic cross-sectional views for describing production methods for prepregs according to the present invention. The method shown in FIG. 2 is an embodiment of the production method for the prepreg 10 according to the embodiment described above. In this method, a reinforcing fiber bundle 7 in which reinforcing fibers 1 are uniformly extended in one direction is prepared (a), the reinforcing fiber bundle 7 is impregnated with a first resin composition 2 containing the (A) to (C) components mentioned above to form the reinforcing fiber layer 3 (b), and both surfaces of the reinforcing fiber layer 3 are impregnated with a second resin composition containing the (A) to (C) components and the (D) component mentioned above to form the surface layers 6a and thus the prepreg 10 is obtained (c).

In the method shown in FIG. 3, a reinforcing fiber bundle 7 in which reinforcing fibers 1 are uniformly extended in one direction is prepared (a), and both surfaces of the reinforcing fiber bundle 7 are impregnated with a resin composition containing the (A) to (D) components mentioned above once to form the surface layers 6a made of the resin composition 2 containing the (D) component 4 with which fibers have not been impregnated and the (A) to (C) components and thus a prepreg 11 is obtained (c).

The prepreg 12 of FIG. 1(b) can be produced by, for example, impregnating a reinforcing fiber bundle with a resin composition containing the (A) to (C) components and then sprinkling the (D) component over the surfaces of the reinforcing fiber bundle impregnated with the resin composition.

Each resin composition with which the reinforcing fiber bundle is impregnated can be prepared by kneading the (A) to (C) components mentioned above and, as necessary, other components, or the (A) to (D) components mentioned above and, as necessary, other components.

The method for kneading a resin composition is not particularly limited; for example, a kneader, a planetary mixer, a biaxial extruder, etc. are used. It is preferable that, from the viewpoint of the dispersibility of the particle components of the (D) component etc., the particles be diffused into liquid resin components beforehand with a homomixer, three rolls, a ball mill, a bead mill, ultrasonic waves, and the like. Furthermore, during mixing with a matrix resin, during preliminary diffusion of particles, or in other cases, it is possible to perform heating or cooling, or pressurization or depressurization, as necessary. After kneading, immediate storage in a refrigerator or a freezer is preferable from the viewpoint of storage stability.

As the viscosity of the resin composition, 10 to 20000 Pa·s at 50° C. are preferable from the viewpoint of the production of a precursor film. 10 to 10000 Pa·s are more preferable, and 50 to 6000 Pa·s are most preferable. In the case of less than 10 Pas, the tackiness of the resin composition may be increased, and coating may be difficult. In the case of more than 20000 Pa·s, semisolidification occurs and coating is difficult.

Examples of the method for impregnating fibers with a resin composition include the wet method in which a resin composition is dissolved in a solvent such as methyl ethyl ketone or methanol to be reduced in viscosity and impregnation therewith is performed and the hot melt method (dry method) in which the viscosity is reduced by heating and impregnation is performed.

The wet method is a method in which reinforcing fibers are immersed in a solution of a resin composition and then pulled up and the solvent is vaporized using an oven or the like. The hot melt method is a method in which reinforcing fibers are directly impregnated with a resin composition that has been reduced in viscosity by heating or a method in which a resin composition is once applied onto a mold release paper sheet or the like in a coating manner to fabricate a film, subsequently the film is superposed from both sides or one side of reinforcing fibers, and heating and pressurization are performed to impregnate the reinforcing fibers with the resin. The hot melt method is preferable because there is substantially no solvent remaining in the prepreg.

The prepreg according to the present invention can be made into a fiber-reinforced composite material by a method in which, after stacking, the resin is cured by heating while pressure is applied to the stacked matter or other methods. Here, examples of the method for applying heat and pressure include the press molding method, the autoclave molding method, the bagging molding method, the wrapping tape method, and the internal pressure molding method. The wrapping tape method is a method in which a prepreg is wound around a cored bar such as a mandrel and a tubular body made of a fiber-reinforced composite material is molded, and is a method suitable in fabricating stick-like bodies such as golf shafts and fishing rods. More specifically, it is a method in which a prepreg is wound around a mandrel, a wrapping tape formed of a thermoplastic film is wound on the outside of the prepreg in order to fix and apply pressure to the prepreg, the resin is cured by heating in an oven, and then the cored bar is taken out to obtain a tubular body.

The internal pressure molding method is a method in which a preform in which a prepreg is wound around an internal pressure applier such as a tube made of a thermoplastic resin is set in a mold, and subsequently a high pressure gas is introduced into the internal pressure applier to apply pressure and at the same time the mold is heated to perform molding. This method is preferably used in molding complicated shaped objects such as golf shafts, bats, and rackets for tennis, badminton, etc.

A composition containing resin particles that contains the (A) to (D) components mentioned above and, as necessary, other components can be suitably used for the preparation of the prepreg described above. A composition containing resin particles in which the amount of the contained (D) component is 15 to 45 parts by mass and preferably 20 to 40 parts by mass when it is assumed that the total amount of the (A) component and the (B) component is 100 parts by mass can be suitably used as the material for forming the surface layer of the prepreg. For the composition containing resin particles, it is preferable that the glass transition temperature of its cured substance obtained by increasing the temperature at 2° C./min and then performing curing under the conditions of 180° C. and 2 hours be 190° C. or more.

Figure 4:
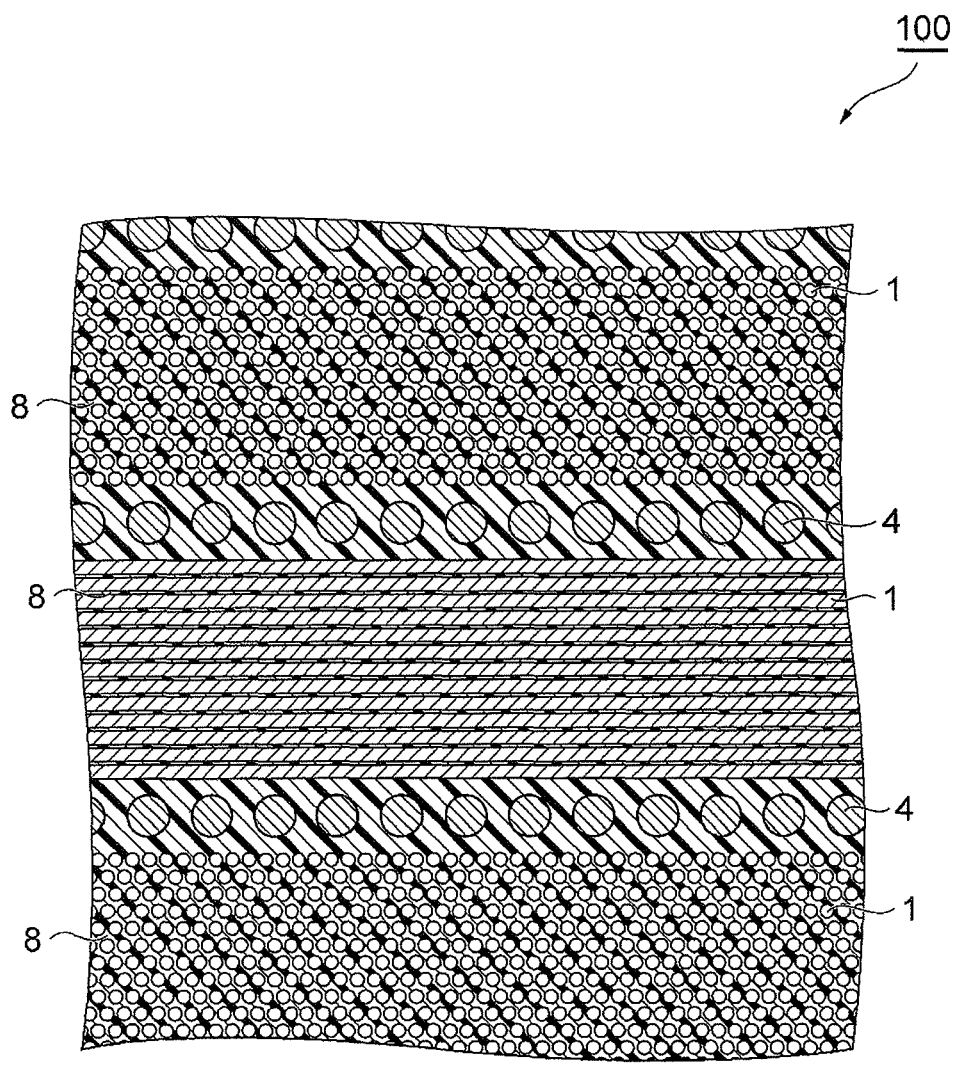
FIG. 4 is a schematic cross-sectional view for describing a fiber-reinforced composite material according to the present invention.

FIG. 4 is a schematic cross-sectional view for describing a fiber-reinforced composite material according to the present invention. A fiber-reinforced composite material 100 shown in FIG. 4 comprises reinforcing fibers 1, a resin cured substance 8, and polyamide resin particles 4. The fiber-reinforced composite material 100 can be obtained by stacking any one of the prepregs 10, 11, and 12 plurally and performing heating under increased pressure.

In the fiber-reinforced composite material, for the volume proportion of $C_1$ in the total amount of the amount $C_1$ of the polyamide resin contained in the resin cured substance between reinforcing fiber layers and the amount $C_2$ of the polyamide resin contained in the reinforcing fiber layers, $\{C_1/(C_1+C_2)\} \times 100$, it is preferable to be 70 volume % or more and it is more preferable to be 80 volume % or more.

The amount of the contained polyamide resin is found by analyzing, by microscopic observation, a cross section of the fiber-reinforced composite material taken along a plane orthogonal to the direction in which an arbitrary reinforcing fiber in the fiber-reinforced composite material extends and performing image analysis to observe the distribution of the polyamide resin.

The fiber-reinforced composite material according to the present invention can be obtained also by directly impregnating a reinforcing fiber matrix with a resin composition and performing curing. For example, the production can be performed by a method in which a reinforcing fiber matrix is placed in a mold and then a resin composition containing the (A) to (D) components mentioned above is poured in followed by impregnation and curing, or a method in which a reinforcing fiber matrix and a film formed of a resin composition containing the (A) to (D) components mentioned above are stacked and the stacked body is heated and pressurized. The film mentioned above can be obtained by applying a prescribed amount of a resin composition with a uniform thickness onto a mold release paper sheet or a mold release film beforehand. Examples of the reinforcing fiber matrix include long fibers uniformly extended in one direction, bidirectional textiles, unwoven fabrics, mats, knits, and braids. The stacking herein includes not only the case where fiber matrices are simply superposed but also the case where preforming is performed by attachment to various molds or core materials. As the core materials, foam cores, honeycomb cores, and the like are preferably used. As the foam cores, urethanes and polyimides are preferably used. As the honeycomb cores, aluminum cores, glass cores, aramid cores, and the like are preferably used.

In the fiber-reinforced composite material according to the present invention, for the compressive strength after impact (CAI) measured in accordance with SACMA SRM 2R-94, it is preferable to be 210 MPa or more and it is more preferable to be 220 MPa or more.

In the fiber-reinforced composite material according to the present invention, for the glass transition temperature of the resin cured substance, it is preferable to be 180° C. or more and it is more preferable to be 190° C. or more.

The fiber-reinforced composite material according to the present invention having the physical properties mentioned above is suitably used for railroad vehicles, aircraft, building members, and other general industrial uses.

Examples

The present invention will now be specifically described using Examples, but the present invention is not limited to them. The measurements of various physical properties are based on the following methods. The results are shown in Table 1.

Examples 1 to 3 and Comparative Examples 1 to 2

For Examples and Comparative Examples, the source materials were mixed with heating at the ratios shown in Table 1, and a first resin composition containing no particles (the "first" composition in Table) and a second resin composition containing particles (the "second" composition in Table) were obtained. The source materials used here are as follows.

The (A) component: a benzoxazine resin
F-a (a bisphenol F-aniline type, manufactured by SHIKOKU CHEMICALS CORPORATION)
P-a (a phenol-aniline type, manufactured by SHIKOKU CHEMICALS CORPORATION)
The (B) component: an epoxy resin
"CELLOXIDE" (registered trademark) 2021P (manufactured by Daicel Corporation)
The (C) component: a curing agent
BPF (9,9-bis(4-hydroxyphenyl)fluorene, manufactured by Osaka Gas Chemicals Co., Ltd.)
BPC (1,1-bis(4-hydroxyphenyl)cyclohexane, manufactured by Sigma-Aldrich Co. LLC.)
TDP (bis(4-hydroxyphenyl) sulfide, manufactured by Tokyo Chemical Industry Co., Ltd.)
The (D) component: polyamide resin particles
PA 11 (polyamide 11, average particle size: 25 μm, manufactured by ARKEMA K.K.)
The (D') component: polyamide resin particles
PA 6 (polyamide 6, average particle size: 20 μm, manufactured by Daicel-Evonik Ltd.)

PA 12 (polyamide 12, average particle size: 20 μm, manufactured by Daicel-Evonik Ltd.)

The (E) component: a toughness improver

A phenoxy resin (YP-70, manufactured by NIPPON STEEL & SUMIKIN CHEMICAL CO., LTD.)

<Production of a Prepreg>

The first and second resin compositions obtained were each applied onto a mold release paper sheet at 70 to 100° C. to obtain a first resin film with 18 g/m² and a second resin film with 25 g/m². The first resin film obtained was supplied from the upper and lower sides of carbon fibers uniformly extended in one direction and the space between fibers was impregnated therewith to form a carbon fiber layer. Subsequently, the second resin film was laminated from the upper and lower sides of the carbon fiber layer to form surface layers; thus, a prepreg was prepared. The amount of carbon fibers per unit area of the prepreg was 150 g/m², and the total amount of the resin composition in the carbon fiber layer and the surface layers (amount of matrix resin) was 86 g/m².

<Measurement of the Melting Point of the Polyamide Resin Particles>

Figure 5:
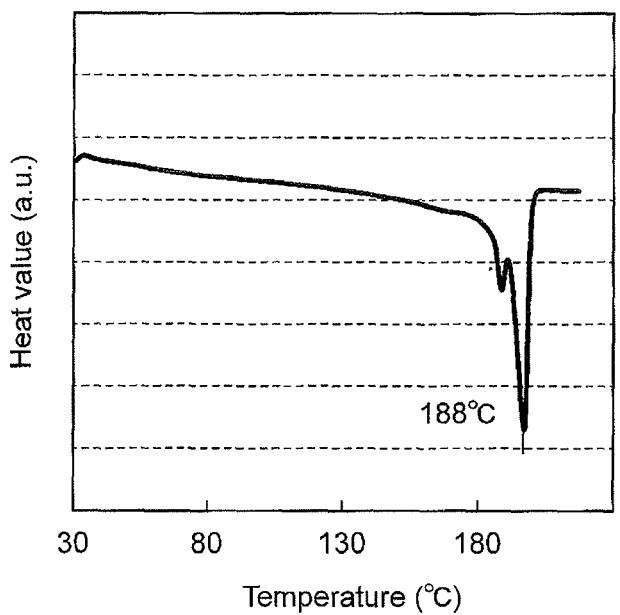
FIG. 5 is a DSC chart of PA 11.

The polyamide resin particles that are the (D) component and the (D') component mentioned above were increased in temperature at a rate of 10° C./minute from 25° C. using a differential scanning calorimeter (DSC), and the top of the resulting endothermic peak was taken as the melting point of the polyamide resin particles. The results are shown in Table 2. A DSC chart of PA 11 is shown in FIG. 5.

<Measurement of the Melting Temperature of the Polyamide Resin Particles in the Second Resin Composition>

Figure 6:
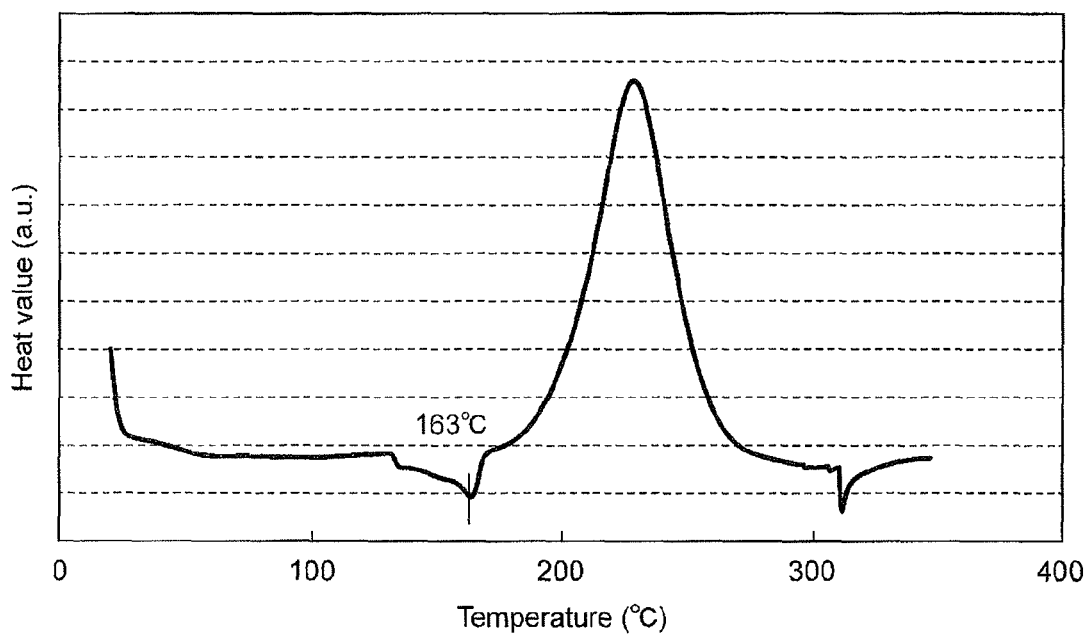
FIG. 6 is a DSC chart of a second resin composition of Example 3.

The second resin composition obtained was increased in temperature at a rate of 10° C./minute from 25° C. using a differential scanning calorimeter (DSC), and the top of the resulting endothermic peak was taken as the melting temperature of the polyamide resin particles in the second resin composition. The results are shown in Table 1. A DSC chart of the second resin composition of Example 3 is shown in FIG. 6.

<Measurement of the Glass Transition Temperature>

The second resin composition obtained was cured for 2 hours in an oven of 180° C. to obtain a resin cured substance. For the cured substance obtained, the middle point temperature found on the basis of JIS K 7121 (1987) using a differential scanning calorimeter (DSC) was measured as the glass transition temperature. The results are shown in Table 1.

<Measurement of the Flexural Modulus>

The second resin composition obtained was cured for 2 hours at a temperature of 180° C. to obtain a resin cured substance. For the resin cured substance, the flexural modulus was measured in accordance with JIS J. 7171. The results are shown in Table 1.

<Measurement of the CAI>

Prepregs obtained were stacked 32 plies pseudo-isotropically with a configuration of $[+45°/0°/-45°/90°]_{4s}$, were increased in temperature in an autoclave at 2° C./minute from room temperature to 180° C. at a pressure of 0.6 MPa, and were then cured by heating for 2 hours at the same temperature; thus, a CFRP was obtained. From the CFRP, in accordance with SACMA SRM 2R-94, a sample of 150 mm long×100 mm broad was cut out, and a falling weight impact of 6.7 J/mm was applied to a central portion of the sample; thus, the compressive strength after impact was found. The results are shown in Table 1.

<The Abundance Ratio (Volume %) of the Polyamide Resin Between Carbon Fiber Layers>

A cross section of the fiber-reinforced composite material taken along a plane orthogonal to the direction in which an arbitrary carbon fiber in the fiber-reinforced composite material extends was analyzed by microscopic observation (500 times), and image analysis was performed for a range of 500 μm×100 μm to observe the distribution of polyamide particles; thereby, the amount $C_1$ of the polyamide resin contained in one piece of the resin cured substance between carbon fiber layers and the amount $C_2$ of the polyamide resin contained in one carbon fiber layer were calculated. This measurement was performed on arbitrary 5 places that are combinations of different carbon fiber layers and different pieces of the resin cured substance, and the average value of the 5 places of $C_1$ and $C_2$ was used to find the volume proportion of $C_1$, $\{C_1/(C_1+C_2)\}\times 100$, per prepreg. The results are shown in Table 1.

TABLE 1

| Component | Source material | Example 1 First | Example 1 Second | Example 2 First | Example 2 Second | Example 3 First | Example 3 Second | Comparative Example 1 First | Comparative Example 1 Second | Comparative Example 2 First | Comparative Example 2 Second |
|---|---|---|---|---|---|---|---|---|---|---|---|
| (A) | F-a | 70 | 70 | 70 | 70 | 70 | 70 | 70 | 70 | 70 | 70 |
|  | P-a | 5 | 5 | 5 | 5 | 5 | 5 | 5 | 5 | 5 | 5 |
| (B) | CELLOXIDE 2021P | 25 | 25 | 25 | 25 | 25 | 25 | 25 | 25 | 25 | 25 |
| (E) | Phenoxy resin YP-70 | 5 | 5 | 5 | 5 | 5 | 5 | 5 | 5 | 5 | 5 |
| (C) | BPF | 10 | 10 | — | — | — | — | — | — | — | — |
|  | BPC | — | — | 10 | 10 | — | — | — | — | — | — |
|  | TDP | — | — | — | — | 10 | 10 | 10 | 10 | 10 | 10 |
| (D) | PA11 (25 μm) | — | 29 | — | 29 | — | 29 | — | — | — | — |
| (D') | PA6 (20 μm) | — | — | — | — | — | — | — | — | — | 29 |
|  | PA12 (20 μm) | — | — | — | — | — | — | — | 29 | — | — |
| Melting temperature of polyamide resin particles (° C.) (in second resin composition) | | — | 170 | — | 167 | — | 163 | — | 156 | — | 200 |
| Glass transition temperature (° C.) | | — | 198 | — | 194 | — | 194 | — | 194 | — | 194 |
| Flexural modulus (MPa) | | — | 4120 | — | 4060 | — | 4000 | — | 3920 | — | 4400 |
| CAI (MPa) | | 275 | | 263 | | 249 | | 200 | | 180 | |
| Abundance ratio (volume %) of polyamide resin between carbon fiber layers | | 88 | | 85 | | 80 | | 30 | | 90 | |

TABLE 2

| Polyamide resin particles | Melting point (° C.) |
|---|---|
| PA11 | 188 |
| PA6 | 225 |
| PA12 | 184 |

As shown in Table 1, it has been found that, in Examples 1 to 3 in which the specific (D) polyamide resin particles were used, an excellent CAI and flexural modulus can be achieved at a high level at the same time, and also the glass transition temperature of the resin material can be kept high.

INDUSTRIAL APPLICABILITY

According to the present invention, a prepreg that makes it possible to obtain a fiber-reinforced composite material that, while using a benzoxazine resin having excellent moisture resistance and heat resistance, can achieve an excellent CAI and flexural modulus at high level at the same time and can also keep the glass transition temperature of the resin material high, a resin composition containing particles for obtaining the prepreg, and a fiber-reinforced composite material can be provided.

The fiber-reinforced composite material of the present invention can be suitably used for aircraft uses, vessel uses, automobile uses, sports uses, and other general industrial uses, and is useful particularly for aircraft uses.

REFERENCE SIGNS LIST

1 . . . reinforcing fibers, 2 . . . resin composition, 3 . . . reinforcing fiber layer, 4 . . . polyamide resin particles, 5 . . . resin composition, 6a, 6b . . . surface layer, 7 . . . reinforcing fiber bundle, 8 . . . resin cured substance, 10, 11 . . . prepreg, 100 . . . fiber-reinforced composite material.

The invention claimed is:

1. A fiber-reinforced composite material obtained by stacking a prepreg plurally and performing heating under increased pressure, wherein the prepreg comprises:
   a reinforcing fiber layer including
     reinforcing fibers and
     a resin composition with which the space between fibers of the reinforcing fibers is impregnated and which contains
       (A) a benzoxazine resin,
       (B) an epoxy resin, and
       (C) a curing agent having 2 or more phenolic hydroxy groups in a molecule; and
   a surface layer provided on at least one surface of the reinforcing fiber layer and containing
     (A) a benzoxazine resin,
     (B) an epoxy resin,
     (C) a curing agent having 2 or more phenolic hydroxy groups in a molecule, and
     (D) polyamide resin particles having an average particle size of 5 to 50 μm,
     wherein the polyamide resin particles include a particle made of a polyamide 11,
   wherein the volume proportion of $C_1$ in the total amount of the $C_1$, which is the amount of the polyamide resin contained in a resin cured substance between the reinforcing fiber layers, and $C_2$, which is the amount of the polyamide resin contained in the reinforcing fiber layers ($\{C_1/(C_1+C_2)\}\times 100$), is 70 volume % or more, and
   wherein the surface layer contains 65 to 80 parts by mass of the (A) component, 20 to 35 parts by mass of the (B) component, 5 to 20 parts by mass of the (C) component, and 15 to 45 parts by mass of the (D) component when it is assumed that the total amount of the (A) component and the (B) component is 100 parts by mass.

* * * * *